United States Patent
Gawda

(10) Patent No.: US 11,302,451 B2
(45) Date of Patent: Apr. 12, 2022

(54) INTERNET OF THINGS CONNECTIVITY DEVICE AND METHOD

(71) Applicant: ORANGE, Issy-les-Moulineaux (FR)

(72) Inventor: Konrad Gawda, Warsaw (PL)

(73) Assignee: ORANGE, Issy-les-Moulineaux (FR)

( * ) Notice: Subject to any disclaimer, the term of this patent is extended or adjusted under 35 U.S.C. 154(b) by 167 days.

(21) Appl. No.: 16/718,813

(22) Filed: Dec. 18, 2019

(65) Prior Publication Data

US 2020/0203027 A1 Jun. 25, 2020

(30) Foreign Application Priority Data

Dec. 19, 2018 (EP) .................................. 18306745

(51) Int. Cl.
| | |
|---|---|
| *H04W 12/069* | (2021.01) |
| *G16Y 30/10* | (2020.01) |
| *G16Y 40/50* | (2020.01) |
| *G16Y 30/00* | (2020.01) |
| *H04W 12/06* | (2021.01) |
| *H04L 29/06* | (2006.01) |

(52) U.S. Cl.
CPC .............. *G16Y 30/10* (2020.01); *G16Y 30/00* (2020.01); *G16Y 40/50* (2020.01); *H04L 63/0876* (2013.01); *H04L 63/102* (2013.01); *H04L 63/12* (2013.01); *H04W 12/06* (2013.01); *H04W 12/069* (2021.01)

(58) Field of Classification Search
None
See application file for complete search history.

(56) References Cited

U.S. PATENT DOCUMENTS

| | | | | |
|---|---|---|---|---|
| 7,289,792 | B1 * | 10/2007 | Turunen | ................... H04L 51/38 |
| | | | | 370/254 |
| 9,654,564 | B2 * | 5/2017 | Malik | .................... H04L 12/189 |
| 9,900,382 | B2 * | 2/2018 | Mazor | .................. H04L 67/2823 |
| 9,948,572 | B2 * | 4/2018 | Sender | .................... H04W 8/18 |
| 10,050,840 | B2 * | 8/2018 | Zheng | .................... H04L 61/103 |
| 10,420,151 | B2 * | 9/2019 | Zakaria | ............... H04W 12/041 |

(Continued)

FOREIGN PATENT DOCUMENTS

EP 2750349 A1 7/2014

OTHER PUBLICATIONS

European Search Report and Written Opinion dated May 3, 2019 for corresponding European Application No. 18306745.3, filed Dec. 19, 2018.

*Primary Examiner* — Lashonda T Jacobs
(74) *Attorney, Agent, or Firm* — David D. Brush; Westman, Champlin & Koehler, P.A.

(57) ABSTRACT

A method for providing an authentication-less access to an internet of things, IoT, platform. The method includes the following acts, performed by a gateway device after receiving a first data packet of a data stream from a first device: determining if the first data packet includes a connection criterion related the IoT platform; enabling the routing of data packets belonging to the data stream between the first device and the IoT platform if the first data packet includes the predetermined connection criterion; and forwarding the first data packet to an authentication portal in order to trigger an authentication procedure between the authentication portal and the first device if the first data packet does not include the predetermined connection criterion.

14 Claims, 5 Drawing Sheets

(56) References Cited

U.S. PATENT DOCUMENTS

| | | | |
|---|---|---|---|
| 10,574,651 B2* | 2/2020 | Kurian | H04L 9/0861 |
| 10,708,069 B2* | 7/2020 | Chun | H04W 4/70 |
| 10,728,340 B2* | 7/2020 | Thummalapalli | H04L 67/141 |
| 10,904,028 B2* | 1/2021 | Jang | H04L 63/083 |
| 10,993,110 B2* | 4/2021 | Annaiah | H04W 4/80 |
| 2014/0082714 A1* | 3/2014 | Sunder | H04L 63/08 |
| | | | 726/7 |
| 2015/0012665 A1* | 1/2015 | Kang | H04L 61/2532 |
| | | | 709/245 |
| 2015/0319749 A1* | 11/2015 | Wadhwa | H04W 12/06 |
| | | | 370/338 |
| 2016/0323689 A1* | 11/2016 | Goluboff | H04L 63/0823 |
| 2017/0063807 A1* | 3/2017 | Cheng | H04L 63/08 |
| 2017/0063823 A1* | 3/2017 | Cheng | H04W 12/08 |
| 2017/0195318 A1* | 7/2017 | Liu | H04L 67/10 |
| 2019/0149480 A1* | 5/2019 | Singhvi | H04L 47/24 |
| | | | 709/226 |
| 2019/0289002 A1* | 9/2019 | Vegh | H04L 63/0823 |
| 2020/0059976 A1* | 2/2020 | Bhatia | H04W 8/005 |
| 2020/0128114 A1* | 4/2020 | Kloberdans | H04L 47/323 |
| 2021/0099875 A1* | 4/2021 | Loupos | H04L 9/083 |
| 2021/0120412 A1* | 4/2021 | Bruner | H04W 4/50 |

* cited by examiner

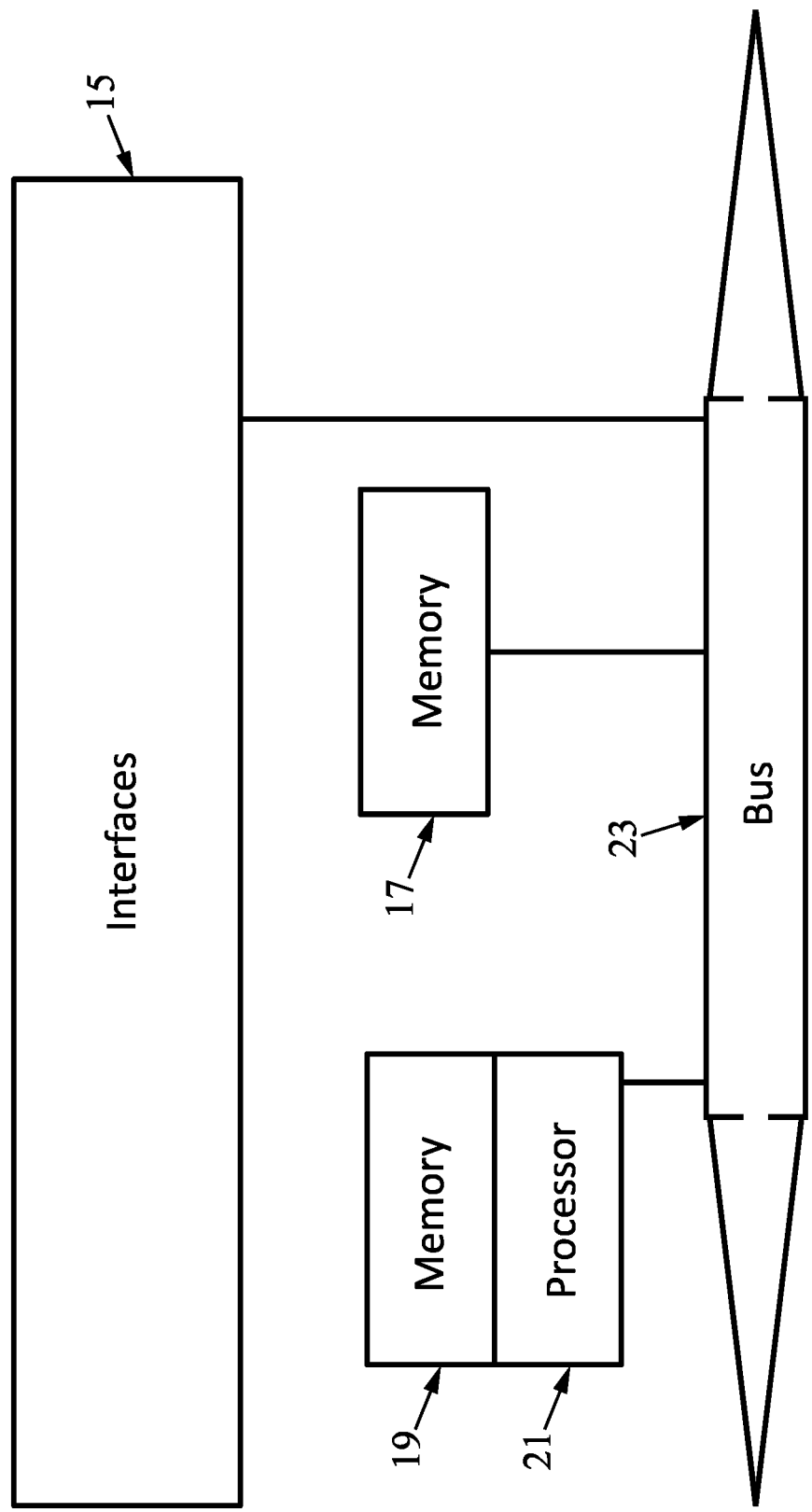

INTERNET OF THINGS CONNECTIVITY DEVICE AND METHOD

BACKGROUND

Technical Field

The present invention relates to the provision of connectivity between devices, and in particular devices that are enabled for wireless communications. More specifically, the invention relates to the provision of connectivity between devices that are intended to form an internet of things, and in particular wireless devices of such a kind. More specifically still, the invention relates to the provision of such connectivity in a manner that requires no human intervention when establishing the connectivity.

Related Art

The term internet of things (IoT) is used to refer to a network of devices that enables the devices to exchange data to perform a function. For example, an IoT of devices in the home can be established to enable automation of tasks in the home such as using data from an electronic calendar to determine whether a central heating thermostat should control central heating to be switched on. Such devices can also be connected to the internet to enable remote control and monitoring. IoTs also find applications in vehicles, including networks of vehicles, agriculture, manufacturing, infrastructure, environmental monitoring and other applications.

To provide connectivity between devices in an IoT, various wireless communication technologies are often used, such as LoRa, SigFox, Narrowband IoT and Wi-Fi, such as the IEEE 802.11 family.

However, when using Wi-Fi for connectivity between IoT devices and IoT platforms, several difficulties may arise. Among others, it is desirable that connection can be achieved without the need for configuration credentials, such as SSID and passphrase on a new device. Without this ability, it is likely that a human intervention will be required when a new device is to be connected to the IoT.

Whilst networks of Wi-Fi access points such as those provided by Orange, for example the "FunSpot" network, that offer a common network name (SSID) over a whole country already exist, they are generally focused on providing internet access for human users. As a result, they rely on authentication methods which are designed for humans and involve entities such as authentication portals, and thus are of limited usability for IoT devices.

In US 2017/195318, a "System and Method for Automatic Wireless Network Authentication in an Internet of Things (IoT) System" is described. However, in the solution provided in this document, authentication is still needed for accessing the platform. Thus, IoT devices need to have a pre-configured passphrase to enable connection. Also, identifiers (for example MAC addresses) of IoT devices need to be known by the system. Besides, the described solution is therefore not intended to use one network for providing both Internet access for humans as well as IoT platform access: It describes for example a firewall of an IoT hub that is configured to block all outgoing and incoming connection requests, other than these directed to designated servers of an IoT service with known host names.

In US 2015/0319749, a "System and Method for Managing Network Resource Impact of Migrant Wi-Fi Users" is described, wherein a wireless device can associate with an open SSID Access Point without authentication. All control and data packets received from such an unauthenticated device are forwarded from the open SSID Access Point to a gateway which assigns a restricted access to this unauthenticated device until it becomes authenticated, so that only authorization/authentication traffic (DNS traffic or authentication web portal traffic) is forwarded by the gateway as long as the device remains unauthenticated. Here again, any IoT device connecting to such a system would be treated similarly to any other device wishing to access internet through the same access point, i.e. this IoT device would have to authenticate itself first with an authentication portal such (as an AAA server) before being able to send data traffic to an IoT platform.

Thus, there is a need to provide a connectivity between IoT devices and IoT platforms which can take into account some or all of the following requirements:

1. No requirement for supplying configuration credentials. The solution must free the end-user from configuring credentials, such as an SSID and passphrase, on a new device.
2. The ability to provide internet access with human-friendly authentication within the same network. This also means that the authentication process should not rely only on a passphrase common for all users.
3. The ability to serve IoT devices that are not previously known to the network. In other words, a device must be able to connect without needing to be provisioned e.g. by knowing the serial number or MAC address of the IoT device. This is an important feature if one wants the system to be able to handle connections from a large number of devices.

It is therefore an aim of the present invention to provide devices and methods for providing access to an IoT in a manner that fulfils at least some of the above requirements.

SUMMARY

In a first aspect, there is provided a method for providing an authentication-less access to an internet of things, IoT, platform, the method comprising the following steps, performed by a gateway device after receiving a first data packet of a data stream from a first device:

determining if the first data packet comprises a connection criterion related the IoT platform;

enabling the routing of data packets belonging to the data stream between the first device and the IoT platform if the first data packet comprises said predetermined connection criterion; and forwarding the first data packet to an authentication portal in order to trigger an authentication procedure between the authentication portal and the first device if the first data packet does not comprise said predetermined connection criterion.

Thus, the method can provide a simple means by which access to an IoT platform can be achieved by the first device without needing human intervention to supply connection credentials, whilst still ensuring that access to other functions, such as internet access can be adequately controlled. Here, the first device can be a device configured for connection to an IoT platform.

In some embodiments, the method further comprises;
receiving, at an access point, the first data packet; and
forwarding the first data packet from the access point to the gateway device without requesting authentication data from the first device. Thus, controlled access can be provided without any credentials being supplied by the first device.

In some embodiments, the connection criterion comprises an IP address and/or a TCP/UDP port number. Thus, a simple means of identifying whether the IoT device should be permitted to connect is provided.

In some embodiments, the method further comprises generating a network access table entry for the transmission control protocol, TCP, flow corresponding to the connection between the first device and the IoT platform. Thus, communications can continue between the first device and the IoT platform without repeated verification of the first device's identity.

In some embodiments, the method further comprises enabling the routing of data packets belonging to the data stream between the first device and the IoT platform using different connection parameters dependent on which of a plurality of different IP addresses and/or a TCP/UDP port numbers is contained in the first data packet. Thus, a simple means of permitting control of the level of access supplied to different devices can be achieved.

In some embodiments, the payload of the first data packet received from the first device is signed using a public encryption key and the method further comprises transferring the first data packet to the IoT platform. Thus, the method can provide a means by which the identity of the first device can be established by the IoT platform.

In some embodiments, the method further comprises receiving a data packet from the IoT platform that is encrypted using a public encryption key held by the first device and the IoT platform and transferring the data packet to the first device. Thus, the method can provide a secure means of transferring information.

In a second aspect, there is provided a gateway device for providing an authentication-less connection between a first device and an internet of things, IoT, platform, wherein the gateway device comprises a controller that is configured to:
  receive a first data packet of a data stream from the first device;
  determine if the first data packet comprises a connection criterion related to the IoT platform;
  enable the routing of data packets belonging to the data stream between the first device and the IoT platform if the first data packet comprises said connection criterion; and
  forward the first data packet to an authentication portal in order to trigger an authentication procedure between the authentication portal and the first device if the first data packet does not comprise said connection criterion.

In some embodiments, the connection criterion comprises an IP address and/or a TCP/UDP port number of the IoT platform dedicated to authentication-less connection.

In some embodiments, the data stream is a transmission control protocol, TCP, flow, the controller being further configured to generate a network access table entry for said TCP flow between the first device and the IoT platform, in order to enable the routing of data packets belonging to the data stream between the first device and the IoT platform.

In some embodiments, the gateway device is configured to permit connectivity using different connection parameters dependent on which of a plurality of different IP addresses and/or a TCP/UDP port numbers is contained in the first data packet.

In some embodiments, the gateway device further comprises:
  an access point through which data packets from the first device are received and/or the
  authentication portal.

In a third aspect there is provided a system for providing an authentication-less connection to a first device, comprising the gateway device of the second aspect and an internet of things, IoT, platform configured to exchange data packets with the first device through the gateway device without any authentication procedure.

In further aspects there is provided a computer program product comprising computer readable instructions which, when implemented on a processor perform all of the steps of the method of the first aspect, and a computer readable medium comprising such a computer program.

BRIEF DESCRIPTION OF THE DRAWINGS

The invention will now be described with reference to the accompanying figures of which:

FIG. 2 illustrates a block diagram of a gateway according to an embodiment of the invention;

DETAILED DESCRIPTION

Figure 1:
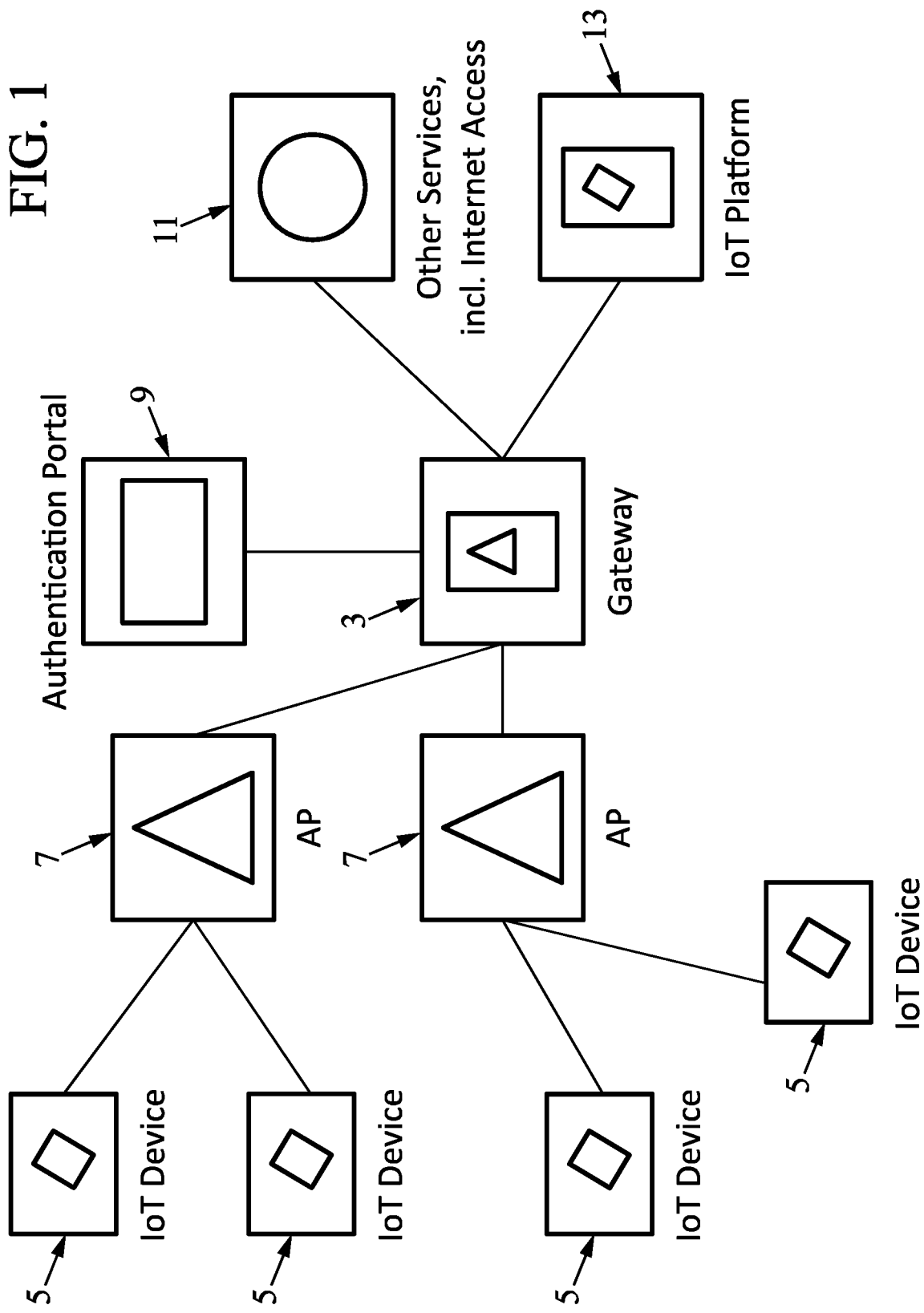
FIG. 1 illustrates an example of a configuration that employs a gateway according to an embodiment of the invention.

FIG. 1 illustrates a system for employing a gateway device 3 in accordance with an embodiment of the invention.

Whilst FIG. 1 illustrates an embodiment in which Wi-Fi technology is employed, the skilled person will recognise that many other wired or wireless communication technologies can also be employed, such as LoRa, SigFox, Narrowband IoT, WiMax (IEEE 802.16), Ethernet, infrared communications, Bluetooth, near-field communication, fibre-optic communication, digital subscriber line (DSL) and others. Moreover, any combination of these technologies can also be used.

As illustrated in FIG. 1, a gateway device 3 provides connectivity to an IoT device 5 via an access point 7, which can typically be a wireless access point for wirelessly connecting IoT devices 5. Whilst only two IoT devices 5 are illustrated as connecting to each of two access points 7, in practice there can be any number IoT devices 5 connecting to each access point 7, and any number of access points 7 connecting to the gateway device 3. Moreover, in general many IoT devices 5 will be configured to connect to each of the many access points 7, typically by sharing the wireless connection. Further, other devices, such as a wireless-enabled computer, can also use the configuration of FIG. 1 to enable connectivity to the internet to be established as will be explained below.

The access point 7 is configured to communicate with the gateway device 3, for example via an access network. The access network can be a layer 2 network using for example Ethernet, VLAN or a layer 3 IP network. Such communications can also be achieved by any of the wired or wireless methods mentioned above. In addition, in some embodiments, the access point 7 and the gateway 3 are physically combined in a single unit, and so such communications can also be achieved by any of various wired or optical communication means such a parallel or serial bus. Moreover, the access point 7 and gateway 3 can even be provided on the same integrated circuit.

The gateway 3 is in turn able to communicate with an authentication portal 9, an internet network 11 and an IoT platform 13. Again, any of the communication technologies mentioned above can be employed for achieving these communications. Moreover, in some embodiments, the authentication portal 9 and/or the IoT platform 13 can be physically combined in a single unit with the gateway 3, and so such communications can also be achieved by any of various wired or optical communication means such a parallel or serial bus. Thus, by connecting first to the gateway 3 via the access point 7, the IoT device can establish communications with the IoT platform 13. The connection to the IoT platform 13 and/or the authentication portal 9 can also be provided via the internet or via a separate network. The authentication portal 9 can also take the form of a cloud-based service. The process for establishing these communications will be explained in greater detail below with reference to FIG. 3.

The skilled person will recognise that, any device wishing to use the configuration illustrated in FIG. 1 to connect to the internet will firstly establish communicate with the access point 7. The access point 7 will then communicate with the gateway 3 to determine whether the device has permission to connect to the internet, for example by using a network access table (NAT) entry for this device if this device is already validated in such a NAT. If the device has permission, then a connection with the internet can be established and communications exchanged between the device and the internet.

If the NAT reveals that device does not already have permission to connect to the internet, then the gateway 3 will intercept traffic from the device and redirect the device to the authentication portal 9, which transmits information back to the device via the gateway 3 and access point 7 to request that the device perform a log-in procedure, for example by supplying configuration credentials such as a user name and password. The process for establishing these communications will be explained in greater detail below with reference to FIG. 3.

FIG. 2 illustrates an example of a gateway device 3 in accordance with an embodiment of the invention.

The gateway 3 comprises a processor device 21 having a processor memory 19. The processor 21 is configured to communication with a further memory 17 and communication interfaces 15 via a bus 23. The interfaces 15 can be interfaces to enable communications via one or more of the previously mentioned communication technologies. Thus, in use, the gateway 3 can receive external communications via any of the interfaces 15 and the bus 23, and process the received external communications using information stored in either the processor memory 19 and/or in the further memory 17. Dependent on the result of the processing, the gateway 3 can then communicate with another external device by passing communications to the interfaces 15 via the bus 23.

The skilled person will realise that the gateway 3 illustrated in FIG. 2 is merely an example of an embodiment of a gateway 3, and that other structures can equally be used to perform the functionality of the gateway 3. Moreover, many of the functions of the gateway 3 can also be accomplished in software.

Figure 3A:
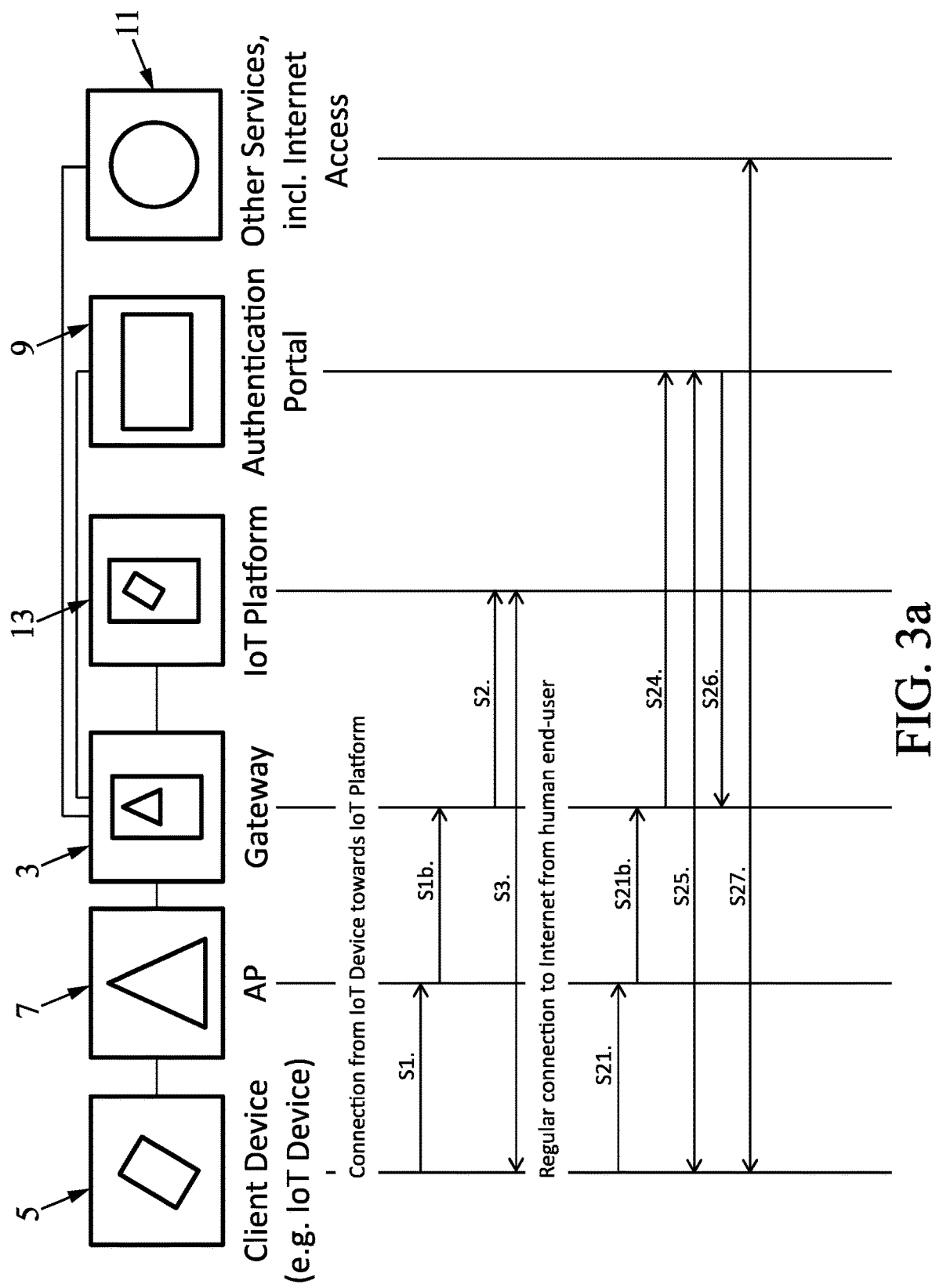
FIGS. 3a and 3b illustrate steps in a method according to the invention for an IoT device to connect to an IoT platform.
Figure 3B:
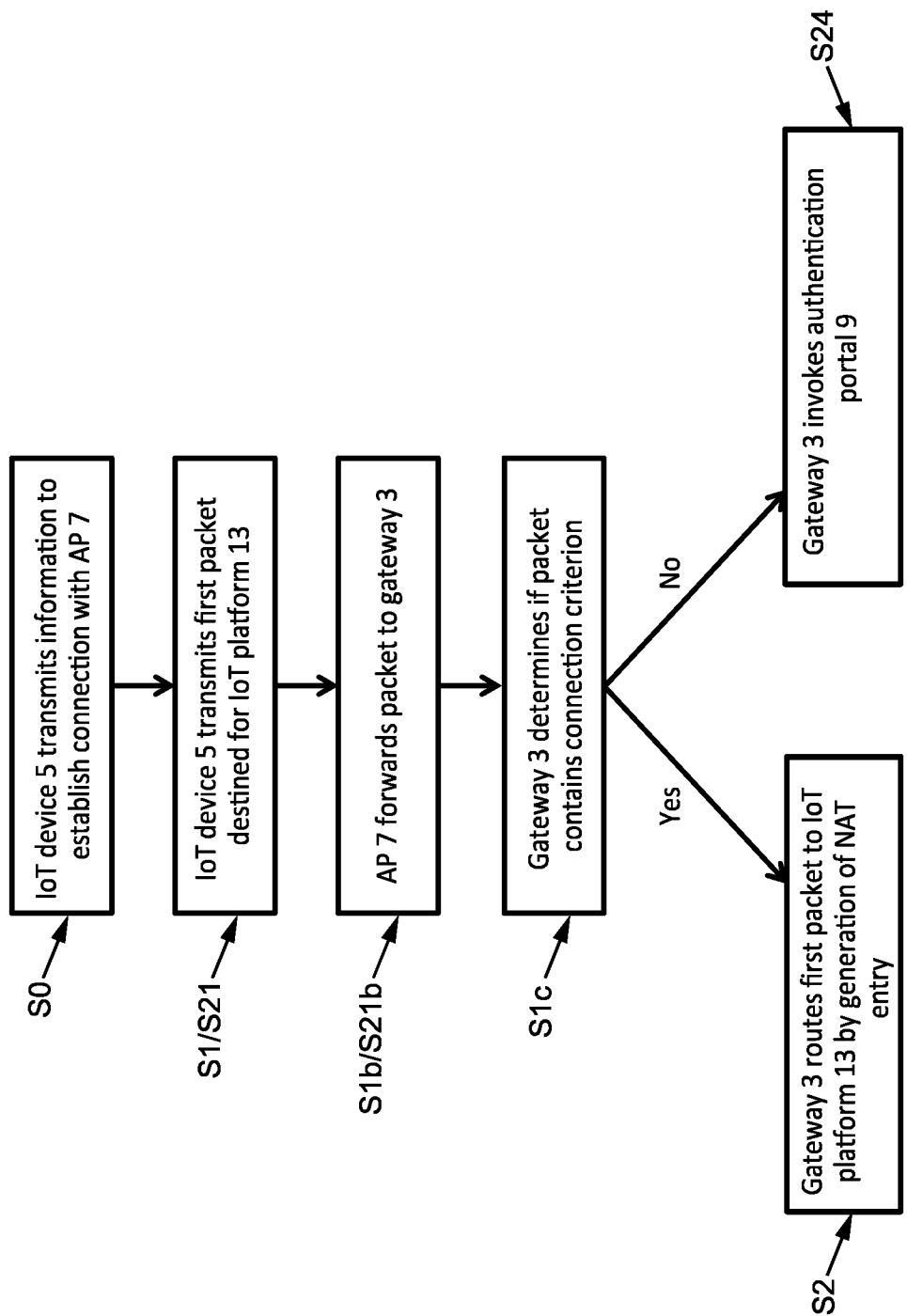

FIGS. 3a and 3b illustrate steps in a method of performing communications between the IoT device 5, and the IoT platform 13 or the internet/other services 11.

To provide the desired functionality for an IoT, as noted above, it is preferable to provide communications between the, or each, IoT device 5 and the IoT platform 13 with the following requirements:
1. There should be no requirement for supplying configuration credentials.
2. The solution should allow connectivity from different points in a region without reconfiguring a device.
3. There should be the ability to provide internet access with human-friendly authentication within the same network that does not only on a passphrase common for all users.
4. There should be the ability to seamlessly serve IoT devices that are not previously known to the network.

Thus, the IoT device 5 wishing to establish a connection to the IoT platform 13 performs the following steps:

Firstly, as per all devices wishing to establish a connection via the configuration of FIG. 1, the IoT device 5 transmits (step S0) information to the access point 7 requesting to establish a connection. The skilled person will recognise that such a request can take the form of an association process as per the IEEE 802.11 set of standards. Moreover, the skilled person will recognise that similar processes can be undertaken if the particular communication means employed utilises a different process for establishing a connection.

Once the IoT device 5 has established a connection with the access point 7, the IoT device 5 sends (step S1) the first packet of information destined for the IoT platform 13 to the access point 7, which will pass the packet on to the gateway 3 (step S1b). Dependent on the content of this packet, the gateway 3 will either pass the packet on to the IoT platform 13 or invoke the use of the authentication portal 9:
  if the packet contains information indicating that the IoT device 5 wishes to connect with the IoT platform 13, in the form of a connection criterion related to this IoT platform 13 (for instance a destination field containing a specific IP address and/or a specific TCP/UDP port of the IoT platform 13), then the packet will be passed to the IoT platform 13 (step S2), in order to trigger the connection between the IoT device 5 and the IoT platform 13 (step 3)
  if the packet does not contain such information, then the authentication portal 9 will be invoked (step S24) as for a regular connection to internet from a human end-user requested from the device through the access point 7 (steps 21a and 21b). In such a situation, the authentication portal 9 performs an authentication procedure with the IoT device 5 (step 25), and if this authentication procedure is performed correctly, informs the gateway 3 (step 26) that the IoT device 5 can be granted access to internet, thereby triggering such an access (step 27).

Thus, the gateway 3 of the embodiment can permit an IoT device 5 to establish a connection with an IoT platform 13 in a manner that requires no user input. However, by only permitting connection to the IoT platform 13 via a connection criterion, such as a specific IP address and/or a specific TCP/UDP port of the IoT platform 13, the gateway 3 can ensure that a controlled level of connectivity can be applied to the IoT device 5. Moreover, for devices that require full connectivity such as computers, or more complex IoT devices communicating with a remote platform located on internet, a connection can also be established by supplying login credentials in the standard manner.

In greater detail, with particular reference to FIG. 3b:

The IoT device 5 first connects to a nearby access point 5 (typically a WiFi access point when the IoT device 5 uses a WiFi connection). The IoT device 5 is typically granted a private IP address by the access point 5 during this connection establishment process.

Advantageously, the establishment of this connection is performed without requesting authentication data from the user of IoT device 5. In other words, it is a "user authentication less" connection process.

For instance, the access point can belong to an "open" network such as an open WiFi network, in which access points do not request any credential to allow the wireless connection of terminal devices. Alternatively, the access point 7 may request some credentials such as a passphrase for instance, which can be stored beforehand in the IoT device 5 in order to be inserted in the connection request the IoT device 5 sends to the access point 7, so that the user of the IoT device 5 is not aware of the authentication.

After that the IoT device 5 has successfully established a connection with the access point 7, the IoT device 5 starts exchanging data with the access point 7 in order to access a service provided through the network. In order to do so, the IoT device 5 transmits (step S1) a first data packet of a data stream to the access point 7. In a particular embodiment wherein this data stream corresponds to a TCP flow, this first data packet typically contains a TCP SYN field and can be recognized by the access point 7 on that basis.

This data packet is forwarded (step S1b) from the access point 7 to the gateway 3, regardless of its target IP address and TCP/UDP port.

The gateway 3 then determines (step S1c) if this first data packet comprises a predetermined connection criterion related to the IoT platform 13. In a specific embodiment, this can be achieved by determining if the first data packet contains a destination field in which is indicated the IP address and/or a TCP port of the IoT platform 13 that is dedicated to establishing communications with the IoT platform 13 without authentication.

In order to enable the gateway 3 to perform such a determination step, the gateway 3 may be pre-configured beforehand with one or more IP address and/or TCP port number(s) of the IoT platform 13, which are to be used for establishing communications with the IoT platform 13 without authentication. It may be that all IP destination address and/or TCP port numbers of the IoT platform 13 are dedicated to communications without authentication. Alternatively, some of the IP destination address and/or TCP port numbers of the IoT platform 13 may be dedicated to authentication-less communication, while others remain subject to some kind of authentication.

If the gateway 3 determines indeed that the first data packet comprises a destination field containing the IP address and/or a TCP port of the IoT platform 13 that is dedicated to establishing communications with the IoT platform 13 without authentication (Yes in FIG. 3b), the wireless Gateway 3 recognizes it and then enables (step S2) the routing of the first data packet, as well as subsequent data packets belonging to the same data stream between the IoT device 5 and the IoT platform 13.

In order to do so, the gateway 3 generates a new network access table (NAT) entry matching the TCP flow of this first data packet. The gateway 3 then applies this NAT entry to route this first data packet, so that it is immediately forwarded (step S2) to IoT Platform 13.

Further communications between the IoT device 5 and the IoT platform 13 can then proceed (step S3) in the usual manner for communications via the Gateway 3, the NAT entry being used to route the subsequent data packets of the TCP flow between the IoT Device 5 and the IoT Platform 13.

It should be noted that, once it has received the first data packet (step S2), the IoT platform 13 can very well trigger its own authentication procedure with the IoT device 5 before proceeding further with communicating with IoT device 5, such an authentication procedure being performed preferably without any human end-user intervention (for instance using pre-stored credentials in the IoT device 5). Naturally, in a very open embodiment, it can also be decided that the IoT platform 13 does not trigger any authentication on its own, so that any IoT device 5 may communicate directly with it, without any sort of authentication, provided that the proper connection criterion is inserted in the data packets sent from the IoT device 5.

In that sense, the present invention does not aim at providing a completely authentication-free communication between an IoT device and an IoT platform.

The present invention rather aims at providing an authentication-less access to an IoT platform (which allows such an authentication-less access) while providing an authentication-based access (e.g. through an authentication portal) otherwise.

Here, a distinction is thus made between cases where an authentication is to be performed before allowing any further access, for instance to a wider network such as internet and in particular to an IoT platform accessible through internet (common case), from cases wherein an IoT platform can be accessed directly by an IoT device, without any authentication required for this access.

On the other hand, other Internet hosts besides the IoT platform 13 may not be available for the IoT device 5 without authentication, to prevent undesired access by the IoT device 5 or from devices masquerading as an IoT device. If however the IoT device 5 tries to communicate with such other internet hosts, then the gateway 3 can be configured to invoke the authentication portal 9 as per any device other than an IoT device 5. This process is explained below.

If the IoT device 5 is targeting access to a service other than a service provided through the IoT platform 13, for example an access to the internet requested by a human user or to an IoT remote platform requesting some kind of authentication, then the process proceeds as follows:

The IoT device 5 transmits (step S21) a first data packet of a data stream to the access point 7. Here also, in a particular embodiment wherein this data stream corresponds to a TCP flow, this first data packet typically contains a TCP SYN field.

This first data packet is forwarded (step S21b) from the access point 7 to the gateway 3 as described above. However, since this first data packet is targeting here some Internet host other than the IoT Platform 13 specially allowed in this IoT network, when the gateway 3 checks (step S1c) if this first data packet is targeting a specific IP destination address and/or TCP port on the IoT platform 13 that is allowed for establishing communications with the IoT platform 13 without authentication, the gateway 3 recognizes that this is not the case.

In such a situation, instead of enabling the routing of the data stream between the device 5 and the IoT platform 13 without any authentication, the gateway 3 forwards (step S24) the first data packet to the authentication portal 9 in order to trigger an authentication procedure wherein log-in credentials are requested from the requesting device. The skilled person will recognize that this situation uses known methods for accessing a network by supplying login credentials to an authentication portal, and so a detailed description of the process is omitted here.

Subsequently, the IoT device 5 exchanges data (step S25) with authentication portal 9 to log-in/sign in, such as by the user of IoT device 5 filling in some forms and/or providing payment information, for instance. After a successful sign on, the authentication portal 9 informs (step S26) the gateway 3 that the IoT device 5 is allowed to connect to Internet. Subsequently, the IoT device 5 can re-attempt to send the first data packet, and this time the gateway 3 creates the relevant NAT entry and forwards (step S27) this first data packet, and any subsequent data packet(s) belonging to the same TCP flow, using this NAT entry. This may also be done for any new TCP flows initiated by the IoT device 5.

In this manner the wireless Gateway 3 of the described embodiment can provide both direct access to IoT devices, without human intervention or user authentication, and also regulated access to human users.

The skilled person will recognize that more than one specific IP address and/or specific TCP/UDP port of the IoT platform 13 can be configured to permit the establishment of communications with the IoT platform 13. Moreover, the different IP addresses and/or TCP/UDP ports can be configured with different levels of access and/or different access (or connection) parameters, such as available communication bandwidth. Thus, for example, by specifying a different IP address and/or specific TCP/UDP port of the IoT platform 13, the IoT device can be enabled with different communication bandwidths or levels of service.

The skilled person will also recognise that a connection criterion other than an IP address or TCP/UDP port can equally be employed to signal that the IoT device 5 wishes to connect to the IoT platform 13. For example a particular flag or field in a message can be used as such a connection criterion, to signal the wish to connect in an authentication-less manner to the IoT platform 13.

As previously stated, communication systems other than Wi-Fi that use different communication protocols can equally be used to implement the invention. The skilled person will recognise how to employ an IP address, TCP/UDP port and/or other flag or message field in such communication protocols in order to implement the invention.

The solution provided by the invention also allows for high volume production of cheap and small-sized IoT devices since it permits the devices to be very simple in construction. Moreover, the invention also makes it easy for end users to use them, since the need for configuration by a user will be removed in many cases.

Further, the invention provides a means of monetization of Wi-Fi access points for operators of such networks. Additionally, the invention can also enable the provision of Wi-Fi based IoT devices that have enhanced capabilities for end users. For example, an advantage in comparison to other network access management approaches such as cellular networks is that a subscription for wireless connectivity can be purchased after the IoT device was produced and packed. The IoT device 5 can be provided with a pre-configured name of one or more Wi-Fi networks, but a vendor will have the ability to add additional connectivity subscriptions prior to sale of the device. Moreover, a vendor has the ability to pre-configure a plurality of different networks from a variety of suppliers for use with the IoT device 5, but later on can choose to only purchase services from a sub-set of the suppliers. This enables the vendor to choose suppliers after selling the IoT device 5, and is cost effective in comparison to alternative methods of selecting service suppliers, such as by having a SIM card for a supplier pre-installed in each device.

The present invention permits the elevation of the problem of authentication to a higher level since authentication takes place between the IoT device 5 and the IoT platform 13. This permits new authentication models to be adopted, without the need to aligning the authentication models with existing network deployments. As an example, a process of full authentication can be replaced with signed messages. Such an authentication process could be applicable to, for example, environmental sensors.

Figure 4:
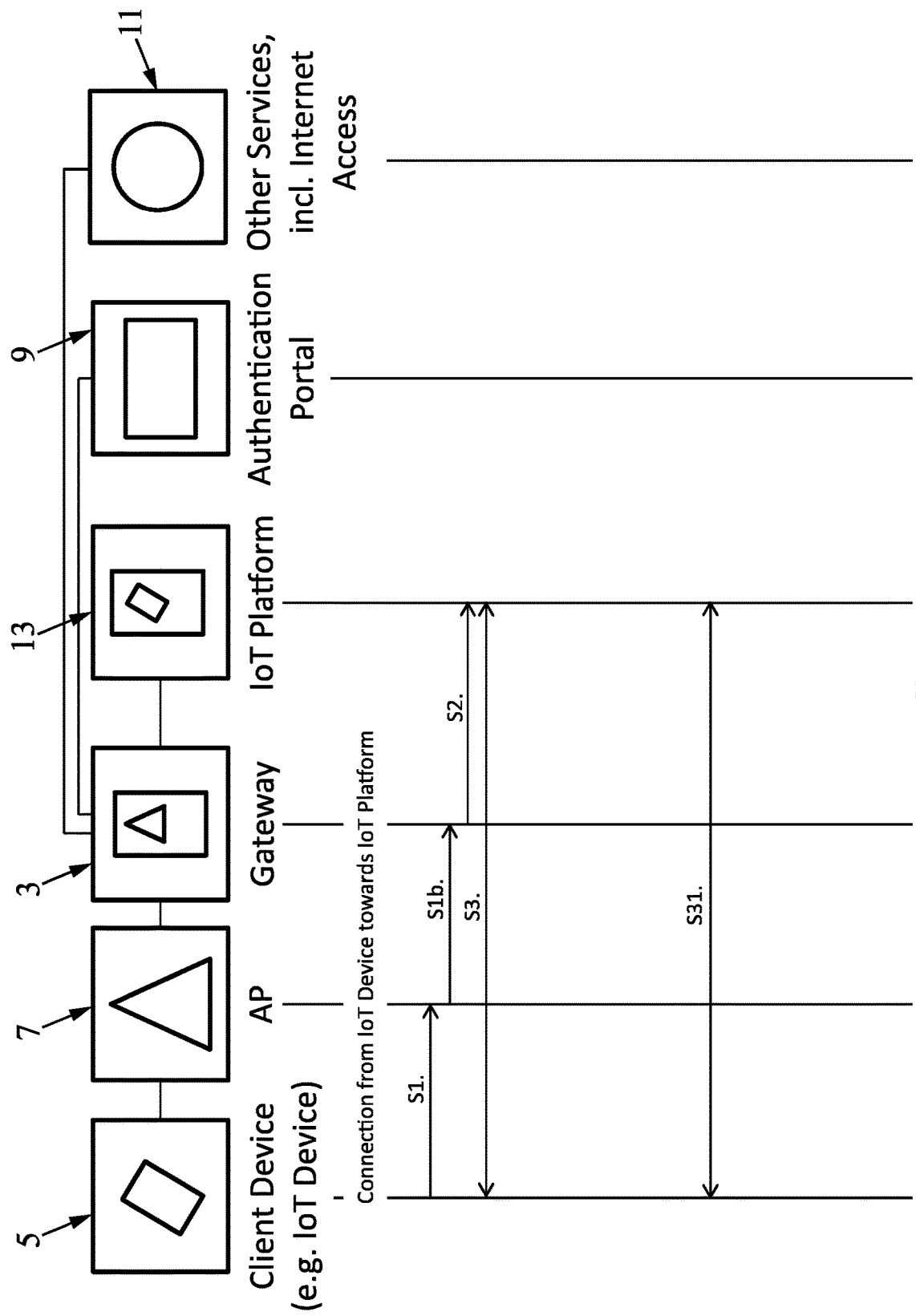
FIG. 4 illustrates steps in a method according to a further embodiment.

Thus, in an alternative embodiment illustrated in FIG. 4, steps S1, S1b, S2 and S3 are carried out as described above for an IoT device 5 wishing to establish communications with an IoT platform 13. However, the IoT device additionally possesses a pair of cryptographic keys, i.e. a public key and a private key. The IoT device 5 also has an algorithm for performing a digital signature process using a public key cryptography method, while the IoT platform is provided with the public key of each IoT device 5.

Each time the IoT device 5 wants to report data to the IoT platform 13, it prepares a message with data to be transmitted and a digital signature. This message is sent (step S31) to the IoT platform 13. Upon receipt of the message, the IoT platform 13 verifies the signature before further processing of the data. Thus, this embodiment can provide means by which an IoT platform can ensure that data received from an IoT device is from a recognized device and not from a device merely purporting to be a recognized device.

In a further embodiment, a further advantage can be achieved if the verification process is only carried out for a limited subset of messages transmitted by the IoT device 5. Such messages can be, for example, randomly selected. If only a limited subset of messages is verified in this manner then a reduction in the amount of data required for transmission of the messages can be achieved.

On the other hand, if a particular use-case requires privacy of the data, messages can be encrypted using the public key after signing. Moreover, messages from the IoT platform 13 to the IoT device 5 can be transmitted safely if encrypted using IoT device's public key.

Another important consideration for IoT systems is the amount of data transmitted between IoT devices 5 and the IoT platform 13. Thus, in further embodiments, measures can be taken to forbid using the connection between the IoT device 5 and the IoT platform as general purpose internet connection. In such an embodiment, the gateway 3 has the possibility to limit amount of traffic for such connection. By enforcing such a limit, this in turn enforces a limit to the traffic to and from the IoT platform 13, thereby effectively controlling the traffic in a simple manner.

In further embodiments, the configuration can provide a service wherein context enrichment of the connection between the IoT device 5 and the IoT platform 13 is provided. For example, based on knowledge of the network plan, an estimate of the geographical position of given IoT device 5 connected to the network can be made. This information can be made available to the IoT device 5 or its IoT platform 13 by an application programming interface (API), thereby extending possible functions. For example, if the IoT device 5 were a smart bicycle lamp, then the IoT platform 13 can know the location of the device 5 using knowledge of the connection used by the device 5 to the platform 13 and provide services such as opening the door to the user's house when the device 5 is close to the user's house and/or configuring a coffee machine to make coffee for the user. The knowledge of the connection can, for example, take the form of knowledge of the particular WiFi access point 7 through which the IoT device 5 achieves its connection to the IoT platform 13. Alternatively or additionally, knowledge of the connection can take the form of a modified message header or content that indicates from which Access point a message has passed through. For example, the WiFi access points 7 can be configured to add specific flags to the messages received from the IoT devices. The gateway 3 can then store information indicating the geographical location of each of the different WiFi access points 7 together with an indication of the flag related to each access point 7.

Whilst the invention will be useful for any kind of device that needs a communication path towards its platform, typical implementation examples will be for cheap, small devices with a limited user interface that are focused on a single function, such as: a "smart pencil", car/bicycle accessories e.g. a "smart bike lamp", wearable devices, "wearable" devices for animals, white goods, utility measurements e.g. electrical energy measurement, water usage measurement, outdoor sensors e.g. air quality sensors, soil hydration sensors, a wall clock using automatic time setup or drones.

With particular regard to examples of functions that could be provided by a wearable device, these could include: a notifier/display e.g. a pager, vibration alarm or a picture frame, an input device e.g. a keyboard or single button (such as the Amazon Dash® Button), a microphone, a camera, an actuator e.g. door lock, relay, a personal sensor/logger e.g. sports activity logger, an anonymous sensor/logger an e.g. air quality sensor, a tracker e.g. geographic locator of a pet, a navigator e.g. navigational aid, such as a GPS system or a token e.g. a key pendant triggering an action when it appears in given location.

Embodiments can be embedded in a computer program product, which comprises all the features enabling the implementation of the methods described herein, and which—when loaded in an information processing system— is able to carry out these methods. Computer program means or computer program in the present context mean any expression, in any language, code or notation, of a set of instructions intended to cause a system having an information processing capability to perform a particular function either directly or after conversion to another language.

Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method for providing an authentication-less access to an internet of things, IoT, platform, the method comprising the following acts, performed by a gateway device after receiving a first data packet of a data stream from a first device:
   determining if the first data packet comprises a connection criterion related to the IoT platform;
   enabling routing of data packets belonging to the data stream between the first device and the IoT platform if the first data packet comprises said connection criterion; and
   forwarding the first data packet to an authentication portal in order to trigger an authentication procedure between the authentication portal and the first device if the first data packet does not comprise said connection criterion.

2. The method according to claim 1, further comprising:
   receiving, at an access point, the first data packet; and
   forwarding the first data packet from the access point to the gateway device without requesting authentication data from the first device.

3. The method according to claim 1 wherein the connection criterion comprises at least one of an Internet Protocol (IP) address or a Transmission Control Protocol (TCP)/User Datagram Protocol (UDP) port number.

4. The method according to claim 1 further comprising generating a network access table entry for the Transmission Control Protocol (TCP) flow corresponding to the connection between the first device and the IoT platform.

5. The method according to claim 4, the method further comprising enabling the routing of data packets belonging to the data stream between the first device and the IoT platform using different connection parameters dependent on which of a plurality of different Internet Protocol (IP) addresses or TCP/User Datagram Protocol (UDP) port numbers is contained in the first data packet.

6. The method according to claim 1, wherein the payload of the first data packet received from the first device is signed using a public encryption key and the method further comprises transferring the first data packet to the IoT platform.

7. The method according to claim 1, further comprising receiving a data packet from the IoT platform that is encrypted using a public encryption key held by the first device and the IoT platform and transferring the data packet to the first device.

8. A gateway device for providing an authentication-less access to an internet of things, IoT, platform, wherein the gateway device comprises a controller that is configured to:

receive a first data packet of a data stream from a first device;

determine if the first data packet comprises a connection criterion related to the IoT platform;

enable routing of data packets belonging to the data stream between the first device and the IoT platform if the first data packet comprises said connection criterion; and forward the first data packet to an authentication portal in order to trigger an authentication procedure between the authentication portal and the first device if the first data packet does not comprise said connection criterion.

9. The gateway device according to claim 8, wherein the connection criterion comprises at least one of an Internet Protocol (IP) address or a Transmission Control Protocol (TCP)/User Datagram Protocol (UDP) port number of the IoT platform dedicated to authentication-less connection.

10. The gateway device according to claim 8, wherein the data stream is a Transmission Control Protocol (TCP) flow, the controller being further configured to generate a network access table entry for said TCP flow between the first device and the IoT platform, in order to enable the routing of data packets belonging to the data stream between the first device and the IoT platform.

11. The gateway device according to claim 9, wherein the gateway device is configured to permit connectivity using different connection parameters dependent on which of a plurality of different IP addresses or TCP/UDP port numbers is contained in the first data packet.

12. A system for providing an authentication-less access to an internet of things, IoT, platform, comprising:

the IoT platform, which is configured to exchange data packets with a first device through a gateway device;

the gateway device, which comprises a controller that is configured to:

receive a first data packet of a data stream from the first device;

determine if the first data packet comprises a connection criterion related to the IoT platform;

enable routing of data packets belonging to the data stream between the first device and the IoT platform if the first data packet comprises said connection criterion; and forward the first data packet to an authentication portal in order to trigger an authentication procedure between the authentication portal and the first device if the first data packet does not comprise said connection criterion.

13. A non-transitory computer readable medium comprising a computer program comprising instructions which when executed by a processor of a gateway device configure the gateway device to perform acts comprising:

receiving a first data packet of a data stream from a first device;

determining if the first data packet comprises a connection criterion related an internet of things, IoT, platform;

enabling routing of data packets belonging to the data stream between the first device and the IoT platform if the first data packet comprises said connection criterion; and forwarding the first data packet to an authentication portal in order to trigger an authentication procedure between the authentication portal and the first device if the first data packet does not comprise said connection criterion.

14. The method according to claim 1, further comprising: the gateway device determining whether the first data packet comprises said connection criterion.

* * * * *